(12) United States Patent
Lambert

(10) Patent No.: US 7,237,231 B2
(45) Date of Patent: Jun. 26, 2007

(54) AUTOMATIC IDENTIFICATION OF INPUT VALUES THAT EXPOSE OUTPUT FAILURES IN A SOFTWARE OBJECT

(75) Inventor: John Robert Lambert, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 10/385,255

(22) Filed: Mar. 10, 2003

(65) Prior Publication Data

US 2004/0181713 A1     Sep. 16, 2004

(51) Int. Cl.
G06F 9/44     (2006.01)
G06F 11/00    (2006.01)
(52) U.S. Cl. .................... 717/127; 717/131; 714/38
(58) Field of Classification Search ............. 717/127, 717/131; 714/38
See application file for complete search history.

(56) References Cited

U.S. PATENT DOCUMENTS

| | | | |
|---|---|---|---|
| 5,542,043 A * | 7/1996 | Cohen et al. ............ | 714/32 |
| 6,249,882 B1 * | 6/2001 | Testardi ................. | 714/38 |
| 6,353,838 B2 * | 3/2002 | Sauntry et al. .......... | 707/206 |
| 6,421,822 B1 * | 7/2002 | Pavela .................... | 717/125 |
| 6,895,578 B1 * | 5/2005 | Kolawa et al. .......... | 717/130 |
| 2003/0097650 A1 * | 5/2003 | Bahrs et al. ............ | 717/124 |
| 2003/0204784 A1 * | 10/2003 | Jorapur ................. | 714/38 |
| 2004/0025083 A1 * | 2/2004 | Nanja et al. ............ | 714/35 |
| 2004/0064806 A1 * | 4/2004 | Johnston-Watt et al. .... | 717/124 |
| 2005/0120276 A1 * | 6/2005 | Kolawa et al. .......... | 714/38 |

OTHER PUBLICATIONS

Model-Based Testing of a Highly Programmable System S.R. Dalal, A. Jain, N. Karunanithi, J.M. Leaton, C.M. Lott Bellcore Applied Research Proceedings Ninth International Symposium on Software Reliability Engineering p. 174-178 IEEE 1998.

* cited by examiner

*Primary Examiner*—Tuan Dam
*Assistant Examiner*—Eric B. Kiss
(74) *Attorney, Agent, or Firm*—Workman Nydegger

(57) ABSTRACT

Computerized testing of a system to identify combinations of input values that expose failures in the system's operation. Attributes are applied to fields in a source code version of a test case template corresponding to the object. Applied attributes can indicate fields that are to be used when generating test cases for the object. The source code version of the test case template is subsequently compiled or interpreted into a binary test case template. Metadata in the binary test case template is inspected (e.g., through reflection) to identify the fields, data types, and attributes that are to be used when generating test cases. Based on possible input values for the identified fields and generation rules, a plurality of test cases is generated. The generated test cases are executed to identify combinations of input values that expose failures in the system's operation.

35 Claims, 4 Drawing Sheets

AUTOMATIC IDENTIFICATION OF INPUT VALUES THAT EXPOSE OUTPUT FAILURES IN A SOFTWARE OBJECT

BACKGROUND OF THE INVENTION

1. The Field of the Invention

The present invention relates to software development technology. More specifically, the present invention relates to mechanisms for testing an object to identify combinations of input values that expose failures in the object's output.

2. Background and Related Art

Computers have revolutionized the way we work and play. There are an enormous variety of functions and applications that may be implemented by a general purpose computing system in response to the execution of a software application. The utility and functionality of the computing system does, however, rely on the proper coding of the source code that was compiled or interpreted into the binary instructions that are actually executed by the processor. If there is a coding error, this will often result in a deviation from expected functionality.

Extraordinary efforts are currently in place to reduce the number of unexpected performance deviations in many software programs before and after the software application are shipped to market. However, the creativity of software programmers and designers has led to increasingly complex and powerful software applications. As the complexity of the software application increases, so often does the number of lines of source code needed to generate the software application.

One way of drafting source code in a more organized manner, is to use object-oriented programming to cause run-time objects to be generated in memory. These objects have associated methods (which are potentially also objects) that can be invoked to manipulate (e.g., create, destroy, perform operations on) the object associated with the method or even other objects. A method is typically invoked by supplying an appropriate input value to each input field (also viewed as objects) of the method (commonly referred to as "calling" the method). Accordingly, a method can also manipulate the objects that are passed to a method when the method is invoked. For example, to create a "FileStream" object, a File Stream creation method can be called with appropriate input values for a File Mode input field, a File Access input field, and a File Share input field. Depending on the input values supplied to these input fields, a FileStream object with particular characteristics can be created.

Unfortunately, even when a method is properly invoked, the method may encounter a situation that it cannot address. For example, some combinations of supplied input values may cause a method to generate inappropriate output or even cause the method to fail to generate any output at all. Failure in a method's output can result, for example, when a supplied input value is incompatible with an operating system (e.g., supplying a filename including unsupported characters or an invalid path), is of an inappropriate data type (e.g., supplying a floating point number to a Boolean input field), or when a first input value is inconsistent with a second input value. Referring back to the File Stream creation method, it would be inconsistent to supply an input value of "READ" to the File Access input field (indicating read-only access) and an input value of "APPEND" to the File Mode input field (thereby implying the file stream will be created for writing). When a method is supplied inconsistent input values the method will typically fail and return an error message, or "throw an exception."

Accordingly, methods (as well as other objects) in a software application are often tested to attempt to identify combinations of input values that will cause output failures. One conventional method of testing software is to have a human tester (which may or may not be the programmer) manually analyze a method (or specification for the method) to identify input fields for the method. The tester may also be required to manually generate rules associated with the input fields, such as, for example, a rule restricting combinations of input values that would result in creating (or opening) a File Stream object in append mode with read-only access. Manually analyzing a method (or specification) and manually generating rules is time consuming and can introduce human error into the testing process. For example, if a tester identifies an inappropriate input field or misspells text included in a rule, the validity of test results can be affected. Further, the time consumed to analyze and generate rules for a number of interrelated methods, such as, for example, those of a software module or application, can be quite significant as each method must be individually analyzed and different rules manually generated for each method.

After identifying input fields and generating associated rules, the tester converts the identified input fields and associated rules into an appropriate format (e.g., a text-based format) that is compatible with a test case generator (potentially introducing additional human error into the testing process). The appropriately formatted input fields and associated rules are then used as input to the test case generator. Based on the input fields and associated rules, the test case generator outputs a number of text-based test cases, each text-based test case representing a possible combination of input values that can be supplied to invoke the method.

Unfortunately, even when the number of input fields is relatively small and each input field has a finite number of input values, the number of possible combinations of input values can be relatively large. For example, a method with five input fields, each having five possible input values would have 3,125 ($5^5$) different possible combinations of input values. Methods having additional input fields and/or having input fields with more possible input values can have significantly more (potentially millions of) possible combinations of input values. As a result, it may take days or even weeks to execute test cases for every possible combination of input values for a method.

For example, in a testing environment that can execute one test case per second it would take approximately 11 days to execute 1 million test cases. Some testing environments can execute test cases more efficiently (e.g., one test case per millisecond) thereby reducing the overall time needed to test a method. However, when testing a software module or application that includes hundreds or even thousands of methods (as well as potentially thousands of other objects) the time requirements can still be quite large. Thus for efficiency purposes, a tester may limit the number of test cases generated for each method based on generation time and execution time constraints Accordingly, it would not be uncommon for even an experienced tester to miss some of the combinations of input values likely to cause output failure in a method.

After text-based test cases for a method are generated, the tester supplies the text-based test cases as input to a testing framework for the method. For each text-based test case, the testing framework reads in the text-based test case and converts input values from text-based test case into typed input values (of the input field data types in the method being tested). For example, if an input field of the method being tested is to receive an integer value, the test framework converts a text-based representation of an input value for the input field into an integer value. After converting input values, the testing framework executes the text-based test case by invoking the method with the combination of input values read from the text-based test case.

Thus for each method in a software module that is to be tested, the tester (or programmer) must develop a testing framework that can read text-based test cases, convert input values to appropriate input field data types, and properly invoke the method. Since many methods in a software module or application will have different combinations of data types and possible input values, a tester (or programmer) may be required to develop a separate testing framework for each method in a software module or application. Developing separate testing frameworks for each method in a software module or application is time consuming and potentially consumes tester (or programmer) resources that could otherwise be used to correct identified output failures (or develop new software). Accordingly, what would be advantageous are mechanisms for testing software in a more automated manner.

BRIEF SUMMARY OF THE INVENTION

The foregoing problems with the prior state of the art are overcome by the principles of the present invention, which are directed towards systems, methods, and computer program products for testing software modules in a more automated manner. Attributes are applied to one or more input fields in a source code version of a test case template to indicate the input fields that are to be used to test an object. The test case template can be included in a source code module that includes source code representing the object. The applied attributes can persist in the metadata of a binary test case template after the source code version of the test case template is compiled or translated into binary instructions, such as, for example, as a result of compiling or interpreting the source code module.

The binary version of the test case template is inspected to identify (as indicated by the applied attributes) the input fields that are to be used to test the object. Inspecting a binary version of a test case template can include using reflection to inspect metadata that was emitted at the time the source code module was compiled into a portable executable. Inspecting a binary version of a test case template (e.g., through reflection) can also be utilized to identify test case generation rules related to the identified fields.

A plurality of test cases is generated based at least on the possible input values for the identified input fields. For example, when there are three input fields each having three possible values, twenty-seven test cases may be generated (one for each possible combination of input values). When appropriate, test cases can be generated in accordance with identified test case generation rules. Test case generation rules can be implemented to exclude combinations of input values that are undesirable or that would otherwise include inconsistent input values for some of the input fields.

In some embodiments, techniques, such as, for example, pair-wise test case generation, are utilized to reduce the number of generated test cases and also to reduce the amount of time needed to run all of the test cases. This is especially advantageous when testing objects that have increased numbers of input fields and/or increased numbers of possible input values per input field. At least one of the generated test cases is executed to determine if a failure in output of the object is exposed. Results of executed test cases are stored for subsequent viewing by a tester.

This process occurs automatically with the tester perhaps only applying the attributes and seeing the final results. Accordingly, since the method does not rely on the substantial time and effort required of human beings to generate test cases, the tester's time may be more suitably focused on evaluating the propriety of the test case results, rather than generating and executing the test cases.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
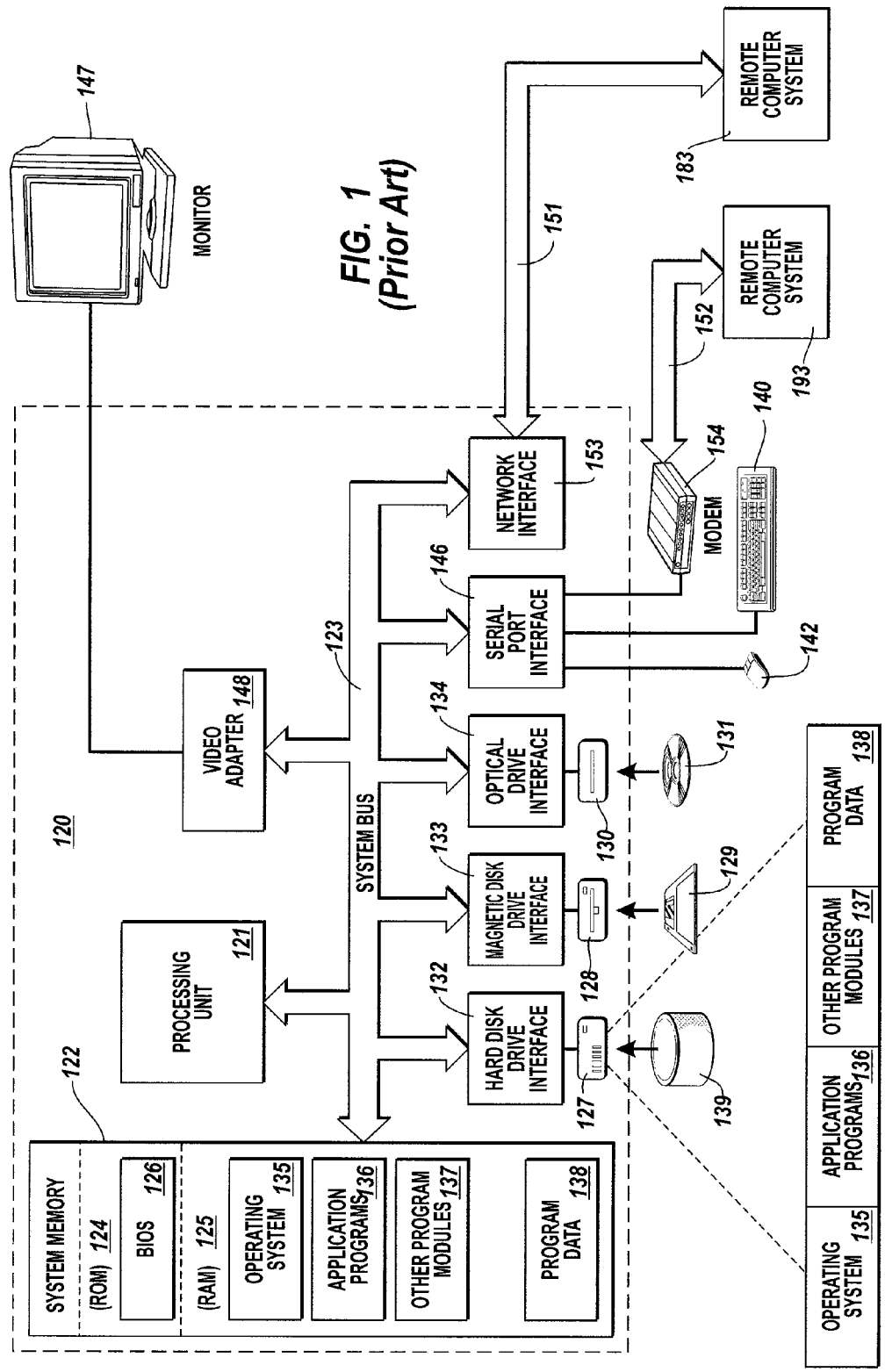
FIG. 1 illustrates a suitable operating environment for the principles of the present invention.

The present invention extends to methods, systems, and computer program product for identifying input values that expose failures in an object's output. Attributes are applied to one or more input fields of an object (e.g., in a source code version of a test case template) to indicate how the input fields are to be considered during test case generation (e.g., included in test cases, excluded from test cases, restricted to specified input values). Applied attributes persist in metadata of a binary test case template after the source code version of the test case template is compiled into a portable executable. During testing, the binary test case template is inspected (e.g., through reflection) to identify the input fields that are to be used to test the object. A plurality of test cases is generated based at least on the possible input values for each of the identified input fields (and potentially also binary generation rules and supplemental manually generated test cases). At least one of the generated test cases is executed to determine if a failure in the output of the object is exposed.

The embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced with many types of computer system configurations, including, personal computers, laptop computers, multi-processor systems, minicomputers, mainframe computers, and the like. The invention may also be practiced in distributed system environments where local and remote computer systems, which are linked (either by hardwired links, wireless links, or by a combination of hardwired and wireless links) through a network, both perform tasks. In a distributed system environment, program modules and associated data structures may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, an example system for implementing the invention includes a general-purpose computing device in the form of computer system 120, including a processing unit 121, a system memory 122, and a system bus 123 that couples various system components including the system memory 122 to the processing unit 121. Processing unit 121 can execute computer-executable instructions designed to implement features of computer system 120, including features of the present invention. The system bus 123 may be any of several types of bus structures including a memory bus or memory controller, a peripheral bus, and a local bus using any of a variety of bus architectures. The system memory includes read only memory ("ROM") 124 and random access memory ("RAM") 125. A basic input/output system ("BIOS") 126, containing the basic routines that help transfer information between elements within the computer 120, such as during start-up, may be stored in ROM 124.

The computer system 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131, such as, or example, a CD-ROM or other optical media. The magnetic hard disk drive 127, magnetic disk drive 128, and optical disk drive 130 are connected to the system bus 123 by hard disk drive interface 132, magnetic disk drive-interface 133, and optical drive interface 134, respectively. The drives and their associated computer-readable media provide nonvolatile storage of computer-executable instructions, data structures, program modules, and other data for computer system 120. Although the example environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer system 120 through keyboard 140, pointing device 142, or other input devices (not shown), such as, for example, a microphone, joy stick, game pad, scanner, or the like. These and other input devices can be connected to the processing unit 121 through serial port interface 146 coupled to system bus 123. Alternatively, input devices can be connected by other interfaces, such as, for example, a parallel port, a game port, a universal serial bus ("USB") port, or a Fire Wire port. A monitor 147 or other display device is also connected to system bus 123 via video interface 148. Computer system 120 can also be connected to other peripheral output devices (not shown), such as, for example, speakers and printers.

Computer system 120 is connectable to networks, such as, for example, an office-wide or enterprise-wide computer network, an intranet, and/or the Internet. Computer system 120 can exchange data with external sources, such as, for example, remote computer systems, remote applications, and/or remote databases over such a network.

Computer system 120 includes network interface 153, through which computer system 120 receives data from external sources and/or transmits data to external sources. As depicted in FIG. 1, network interface 153 facilitates the exchange of data with remote computer system 183 via communication link 151. Communication link 151 represents a portion of a network, and remote computer system 183 represents a node of the network. For example, remote computer system 183 may store test case templates that are processed by computer system 120 to test objects. On the other hand, computer system 120 may store test case templates that are processed by computer system 183 to test objects.

Likewise, computer system 120 includes serial port interface 146, through which computer system 120 receives data from external sources and/or transmits data to external sources. Serial port interface 146 is coupled to modem 154, through which computer system receives data from and/or transmits data to external sources. As depicted in FIG. 1, serial port interface 146 and modem 154 facilitate the exchange of data with remote computer system 193 via communication link 152. Communication link 152 represents a portion of a network, and remote computer system 193 represents a node of the network. For example, remote computer system 193 may store test case templates that are processed by computer system 120 to test objects. On the other hand, computer system 120 may store test case templates that are processed by computer system 193 to test objects.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, input identification modules, test case generators, test case runners, serializers, and deserializers as well as associated data, including test case templates, metadata, generation rules, test input, test cases, and test results may be stored and accessed from any of the computer-readable media associated with computer system 120. For example, portions of such modules and portions of associated program data may be included in operating system 135, application programs 136, program modules 137 and/or program data 138, for storage in system memory 122.

When a mass storage device, such as, for example, magnetic hard disk 139, is coupled to computer system 120, such modules and associated program data may also be stored in the mass storage device. In a networked environment, program modules and associated data depicted relative to computer system 120, or portions thereof, can be stored in remote memory storage devices, such as, for example, system memory and/or mass storage devices associated with remote computer system 183 and/or remote computer system 193. Execution of such modules may be performed in a distributed environment as previously described.

Some embodiments of the present invention are described with respect to testing a method to identify failures in the method's output. However, the principles of the present invention are applicable to any software object that receives input and generates output based on the received input. Accordingly, the present invention can be practiced to test any such software object to identify failures in the software object's output.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer system 120 through keyboard 140, pointing device 142, or other input devices (not shown), such as, for example, a microphone, joy stick, game pad, scanner, or the like. These and other input devices can be connected to the processing unit 121 through serial port interface 146 coupled to system bus 123. Alternatively, input devices can be connected by other interfaces, such as, for example, a parallel port, a game port, a universal serial bus ("USB") port, or a FIREWIRE® port. A monitor 147 or other display device is also connected to system bus 123 via video interface 148. Computer system 120 can also be connected to other peripheral output devices (not shown), such as, for example, speakers and printers.

The computer system 200 is testing method 227 represented in metadata 202 to automatically identify combinations of input values that expose failures in method 227's output. As previously mentioned, some combinations of input values to a method can cause failures in the method's output. Since combinations of input values are automatically identified, a tester may focus his or her attention on taking measures to correct output failures, rather than manually generating combinations of input values and manually generating testing frameworks.

The rectangular elements in computer system 200 (test case generator 206, input identification module 207, and test runner module 214) represent executable modules that facilitate the testing of method 227. The scrolled elements (test case template 201, test cases 211, and test results 217) represent data that is processed by the executable modules to test an object. The cooperative interaction of these various elements will be described with further reference to FIG. 3, which illustrates a flowchart of a method 300 for identifying combinations of input values that cause failures in an object's output in accordance with the present invention. Accordingly, FIG. 2 will be described with frequent reference to FIG. 3.

As is conventionally known in the art of object oriented-programming, source code can be compiled into language independent portable executables that include metadata describing the types and members (e.g., methods, fields, properties, events) defined in the source code. Binary test case template 201 can be a portable executable representing the results of compiling a corresponding object-oriented source code version of a test case template. Alternately, binary test case template 201 can be generated when instructions in the source code version of the test case template are interpreted by an appropriate interpreter, such as, for example, a PYTHON® or Perl interpreter. Accordingly, binary test case template 201 may not exist in a binary format prior to being interpreted, but instead is generated in system memory as instructions of the source code version of the test case template are interpreted.

Some embodiments of the present invention may be described with respect to compiled binary test case templates that result from compiling a corresponding source code version of the test case template. However, the mechanism used to create and/or generate a binary test case template is not important. It would be apparent to one skilled in the art, after having reviewed this description, that the present invention can also be practiced using interpreted binary test case templates generated through interpretation of a corresponding source code version of the test cast template.

Binary test case template 201 includes metadata 202 describing the types, and members, and attributes defined in the object-oriented source code version of the test case template. More specifically, metadata 202 describes fields 205A, 205B, 205C and 205D (hereinafter referred to as "fields 205A through 205D") that can each be input fields of method 227. Although depicted as separate elements within metadata 202, method 227 can be appropriately coordinated with received input values for fields 205A through 205D at run-time. A just-in-time compiler that translates language independent portable executables into machine specific executable code can facilitate such coordination.

Fields 205A through 205D have corresponding data types 204A through 204D respectively. Data types 204A through 204D represent that each of the fields 205A through 205D is of a particular data type, such as, for example, Boolean, integer, floating point, string, character, enumerated or even user-defined data types. A field of an enumerated data type is a field that can receive an input value from one of a plurality of enumerated input values. For example, a field of a "FileAccess" enumerated data type may receive an input value from among the input values of "Read", "Write" or "Read Write".

The method 300 includes a functional, result-oriented step for determining input fields that are to be used to test an object (step 305). Step 305 can include any corresponding acts for accomplishing the result of determining input fields that are to be used to test an object. However, in the illustrated embodiment of FIG. 3, step 305 includes acts 301 and 302.

Specifically, attributes are applied to one or more input fields in a source code version of a test case template (act 301). A tester can apply attributes to input fields in a source code version of a test case template by inserting appropriate text-based tags into the source code. Applied attributes can persist in metadata after the source code version of the test case template is compiled into a binary test case template or at the time instructions from the source code version of the test case template are interpreted. For example, fields 205A through 205D include corresponding attributes 203A through 203D respectively. Attributes 203A through 203D can represent inserted text-based tags that were associated with fields 205A through 205D before binary test case template 201 was compiled. The dashed rectangles surrounding each of the attributes 203A through 203D represent that each of the attributes 203A through 203D are optional.

A tester can apply one or more attributes to an input field of a test case template to indicate how the input field is to be processed during test case generation. A test field attribute (e.g., "[TestField]") can be applied to an input field to indicate that the input field is a test input field and is to be used when generating test cases. An included enumerated value attribute (e.g., value attribute (e.g., "[TestFieldInclude (FileAccess.Read|FileAccess.Write)]") can be applied to an input field to indicate a bitwise combination of enumerated input values that is to be used as an input value when generating test cases. An exclude enumerated value attribute (e.g., "[TestFieldExclude(FileShare.Inheritable)]") can be applied to a input field to indicate an enumerated input value that is to be excluded as an input value when generating test cases. An express only attribute (e.g., "[ExplicitTestFieldOnly]") can be applied to an input field to indicate that the value for the input field is to be fixed to particular input value when generating test cases (or alternatively read from a supplemental manually generated test case).

In some embodiments, a field's lack of an attribute can result in a default behavior (e.g., using the input field as a test input field) when generating test cases for the method. When a plurality of attributes is applied to an input field, the input field can be processed in accordance with the plurality of attributes. For example, a first attribute can indicate that an input field is a test input field and second attribute can indicate an enumerated input value that is to be excluded for the test input field when generating test cases.

Many computer languages, such as, for example, C++, C#, Perl, PYTHON®, and VISUAL BASIC®, can be used when generating a source code version of a test case template. The following portion of source code is an example source code version of a test case template (hereinafter referred to simply as the "example test case template") to test file stream creation. The example test case template is written in the C# computer language:

```
1.  public class FileTest: FieldBasedTestCase, ITestCase
2.  {
3.      [ExplicitTestFieldOnly] public string Filename = "test.txt";
4.      [TestField] public FileMode Mode;
5.      [TestField][TestFieldInclude(FileAccess.Read|FileAccess.Write)] public FileAccess Access;
6.      [TestField][TestFieldExclude(FileShare.Inheritable)] public FileShare Share;
7.
8.      public override TestCaseResult Run(TextWriter log)
9.      {try
10.         {
11.             log.WriteLine(this.ToString( ));
12.             using(FileStream fs = new FileStream(Filename, Mode, Access, Share))
13.             { fs.WriteByte(42);
14.             }
15.         }
16.         catch(Exception e)
17.         {
18.             log.WriteLine(e.ToString( ));
19.             return TestCaseResult.Fail;
20.         }
21.         return TestCaseResult.Pass;
22.     }
23. }
```

The numbers at the beginning of each line of the example test case template are line numbers that will be used to clarify the description of the example test case template. However, these line numbers are not part of the source code. Line 1 indicates that the example test case template is of a class "FileTest", which is a sub-class of "FieldBasedTestCase" and having a corresponding testing interface "ItestCase". FieldBasedTestCase can implement a function "TestCaseResult Run(Textwriter log)" that executes a test for a particular combination of input values. Accordingly, as a sub-class of FieldBasedTestCase, this function can be accessed by members of the class FileTest.

Line 12 of the example test case template represents invocation of the "FileStream" method to attempt to create a new file stream (identified as "fs") according to the input values for the "Filename", "Mode", "Access", and "Share" input fields. At lines 3–6 these input fields are defined.

Line 3 defines the Filename input field to be of the data type "string." String is a data type representing a combination of characters. An "[ExplicitTestFieldOnly]" attribute has been applied at line 3 to indicate that an input value of "test.txt" is to be supplied to the Filename input field when generating test cases to test file stream creation. Were the Filename input field not set equivalent to test.txt, the input value could be supplied in a supplemental manually generated test case.

Line 4 defines the Mode input field to be of the data type "FileMode". FileMode is an enumerated data type having values that represent how the contents of a file stream are preserved or overwritten, such as, for example, append, create, create new, open, open or create, or truncate. A "[TestField]" attribute has been applied at line 4 to indicate that the Mode input field is a test input field. Accordingly, input values for the Mode input field are to be used when generating test cases for testing file stream creation.

Line 5 defines the Access input field to be of the data type "FileAccess". FileAccess is an enumerated data type having values that represent how a file stream can be accessed, such as, for example, read, write or read/write. A [TestField] attribute has been applied at line 5 to indicate that the Access input field is a test input field. Accordingly, input values for the Access input field are to be used when generating test cases for testing file stream creation. Further, a "[TestFieldInclude(FileAccess.Read|FileAccess.Write)]" attribute has been applied at line 5 to indicate that an input value representing Read/Write access is to be supplied to the Access input field when testing file stream creation.

Line 6 defines the Share input field to be of the data type "FileShare". FileShare is an enumerated data type having values that represent the level of access permitted to a file stream that is already in use, such as, for example, inheritable, none, read, read/write, or write. A [TestField] attribute has been applied at line 6 to indicate that the Share input field is a test input field. Accordingly, input values for the Share input field are to be used when generating test cases for testing file stream creation. A "[TestFieldExclude(FileShare.Inheritable)]" attribute has also been applied at line 6 to indicate that an input value representing inheritable file access is not to be supplied to the Share input field when generating test cases for testing file stream creation.

Before a combination of input values is tested, line 11 is executed to record the combination of input values in a corresponding log file. Lines 12 and 13 are then executed to test a combination of input values for the Filename, Mode, Access, and Share input fields. After a file stream is created at line 12, line 13 is executed to attempt to write a byte to the newly created file stream. When a combination of input values does not expose an output failure (e.g., when a file stream was successfully created and the WriteByte instruction executed successfully) a passing value is returned at line 21. On the other hand, when combination of input values exposes an output failure (e.g., when a file stream was not created successfully or when the WriteByte did not execute successfully), an exception is caught at line 16, an exception message is written to the log file at line 18, and a failing value is returned at line 19. Accordingly, a each combination of input values and any appropriate error messages can be recorded in the log file for later viewing by a tester.

It may be that the example test case template is compiled into a binary test case template (e.g., a portable executable). For example, the example test case template may be compiled into binary test case template 201. Accordingly, the fields 205A through 205D can represent the Filename, Mode, Access, and Share input fields from the example test case template respectively. Similarly, data types 204A through 204D can represent the data types string, FileMode, FileAccess, and FileShare respectively. Likewise, attributes 203A through 203D can represent the applied attributes for input fields Filename, Mode, Access, and Share respectively. Method 227 can represent the FileStream method.

Alternately, it may be that instructions of a source code version of a test case template are interpreted. Accordingly, the source code version of the test case template can be generated as a binary test case template (through direct translation of source code instructions) in system memory at run time.

Referring back to method 200, a binary version of the test case template is inspected to identify test input fields (act 302). For example, as illustrated by arrow 1 in FIG. 2, input identification module 207 inspects binary test case template 201. Input identification module 207 can be configured to parse metadata 202 to identify the fields, attributes, data types, and methods contained in metadata 202. Accordingly, input identification module 207 can identify fields 205A through 205D and identify that these fields receive input values when method 227 is invoked.

One technique used to identify types and members described in metadata is reflection. More specifically, reflection can be utilized (e.g., through a "FieldInfo" class and corresponding "GetFields" method) to identify the name, data type, and standard attributes of fields, such as, for example, fields 205A through 205D. When appropriate, such as, for example, when a field is of an enumerated data type, reflection can be further utilized to identify the possible input values for the field. Similarly, reflection can be utilized (e.g., through a Custom Defined Attribute Class and corresponding "GetCustomAttributes" method) to identify the existence and values of custom attributes, such as, for example, attributes 203A through 203D.

Reflection can also be utilized to identify that fields 205A through 205D receive input values used to invoke method 227. Accordingly, reflection can be utilized to identify most, if not all, of the test input for generating test cases. Identifying test case information from a binary test case template is particularly advantageous when a tester lacks access to a corresponding source code version of the test case template.

The method 300 includes an act of generating a plurality of test cases based at least on the possible input values for each of the identified test input fields (act 303). For example, as illustrated by arrow 2 in FIG. 2, test case generator 206 generates test cases 211. Test case generator 206 can generate test cases 211 according to the input fields, data types, and attributes identified by input identification module 207.

Each test case (e.g., test cases 211A, 211B, 211C, 211E, and potentially other test cases represented by vertical ellipsis 211D) in test cases 211 represents a combination of input values (values 215A through 215D) for the input fields (fields 205A through 205D) of method 227. Accordingly, the input fields in a generated test case can correspond to the input fields from a binary test case template. For example, fields 205A through 205D in test case 211E correspond to fields 205A through 205D from binary test case template 201. The values 215A through 215D can be values of corresponding data types 204A through 204D respectively.

When there are a relatively small number of test input fields for a method and a relatively small number of possible input values for each test input field, test case generator 206 may generate a test case for each possible combination of input values (commonly referred to as a "brute force" approach). For example, when a method is invoked with three test input fields each having three possible input values, test case generator 206 may generate 27 ($3^3$) different test cases. Brute force testing can provide more accurate results (potentially identifying every combination of input values that results in failure of an object's output) since every possible combination of input values is tested. However, as the number of test input fields and/or possible input values for each test input field increases, brute force testing can become time consuming and essentially unmanageable.

Generally, the total number of different combinations of input values for "v" test input fields each having "k" possible input values is $k^v$ (when k is not uniform across all v test input fields, the number of different combinations is equal to the product of all k taken from each input field). Thus, for a particular method with 10 test input fields each having 5 possible input values, the total number of different combinations of input values is $5^{10}$ (9,765,625). Implementing a brute force approach to test the particular method for output failures would result in the generation of 9,765,625 test cases. In a computing environment having the efficiency to execute one test case every second it would take approximately 113 days (9,765,625/(60 seconds×60 minutes×24 hours)) of continuous processing to execute the 9,765,625 test cases. Even in a computing environment that could execute one test every millisecond it would still take over a day of continuous processing to execute the 9,765,625 test cases.

Accordingly, test case generator 206 can implement algorithms to reduce the number of combinations of input values used for generating test cases. It may be that test case generator 206 implements an algorithm for randomly generating a specified number of combinations of input values. Alternately, test case generator 206 can implement an algorithm that generates random combinations of input values for a specified amount of time. Thus, a user can essentially specify the number of test cases resulting from random generation algorithms. However, algorithms that randomly generate combinations of input values may provide no way to determine if the generated combinations adequately cover the range of all possible combinations of input values.

Test case generator 206 can also implement an N-wise (where N equals any integer from 1 to the smallest k value for a test input field) algorithm to reduce the number of combinations of input values used for generating test cases. N-wise algorithms guarantee that for each N test input fields (e.g., each pair of input fields or each triple of input fields) every combination of input values for the N test input fields will be covered in at least one test case. For example, a pair-wise algorithm (N=2) would guarantee that for each pair of test input fields every combination of input values for the pair of test input fields is covered in at least one test case. An all values algorithm (N=1) would guarantee that for each test input field each input value is covered by at least one test case. When N equals the largest k value from among all the test input fields, implementation of an N-wise algorithm is essentially be the same as a brute force approach.

Thus, as N is increased the testing coverage becomes broader (approaching the test coverage of a brute force approach). However, increasing N also results in a corresponding decrease in testing efficiency. A tester can configure N based on an appropriate balance between testing coverage and testing efficiency. A smaller value of N can be selected when more efficient testing is desired. On the other hand, a larger value of N can be selected when broader testing coverage is desired.

Table 1 illustrates an example of test input fields and possible input values for a method:

TABLE 1

| Test Input Field | Possible Input Values |
| --- | --- |
| A | A1, A2 |
| B | B1, B2 |
| C | C1, C2, C3 |

A brute force approach to testing the method represented in Table 1 would result in 2×2×3, or 12, test cases. However, use of a pair-wise algorithm (N=2) can reduce the number of test cases to as few as six, {(A1,A2,C1), (A1,B2,C2), (A2,B1,C3), (A2,B2,C1), (A2,B1,C2), (A1,B2,C3)}. More significant reductions in the number of test cases are realized when a pair-wise algorithm is utilized to generate test cases for increased numbers of test input fields and possible input values. For example, for 8 test input fields each having 8 possible input values (16,777,216 possible combinations) the number of pair-wise test cases can be as few as 105.

Referring back to FIG. 3, the method 300 includes an act of running at least one of the generated tests to determine if a failure in the output of the object is exposed (act 304). As illustrated by arrow 3 in FIG. 2, test runner module 214 receives test cases 211. In addition to input fields, test cases 211 can included the necessary information (e.g., identified through reflection) to invoke method 227. Alternately, test runner module 214 can receive binary test case template 201 as input. Accordingly, test runner module 214 may dynamically invoke (instantiate) method 227 for each test case in test cases 211 to determine if the test case exposes a failure in method 227's output. As illustrated by arrow 4 in FIG. 2, test runner module 214 can output test results for executed test cases to test results 217 (e.g., a log file) for subsequent viewing by a tester.

In some embodiments, test runner module 214 also determines if test cases succeed or fail. When automatically generated test results for a test case conform with test results a tester believes should occur, the test case can be viewed as successful. For example, a tester may configure a test case template to generate test cases that should expose output failures in a method. Accordingly, when automatically generated test results for a test case indicate an exposed failure, the test case is viewed as a success. On the other hand, when automatically generated test results for a test case do not conform with test results a tester believes should occur, the test case can be viewed as failure. For example, a tester may configure a test case template to automatically generate test cases that should not expose output failures in a method.

Accordingly, when automatically generated test results for a test case indicate an exposed failure, the test case is viewed as a failure.

Figure 4:
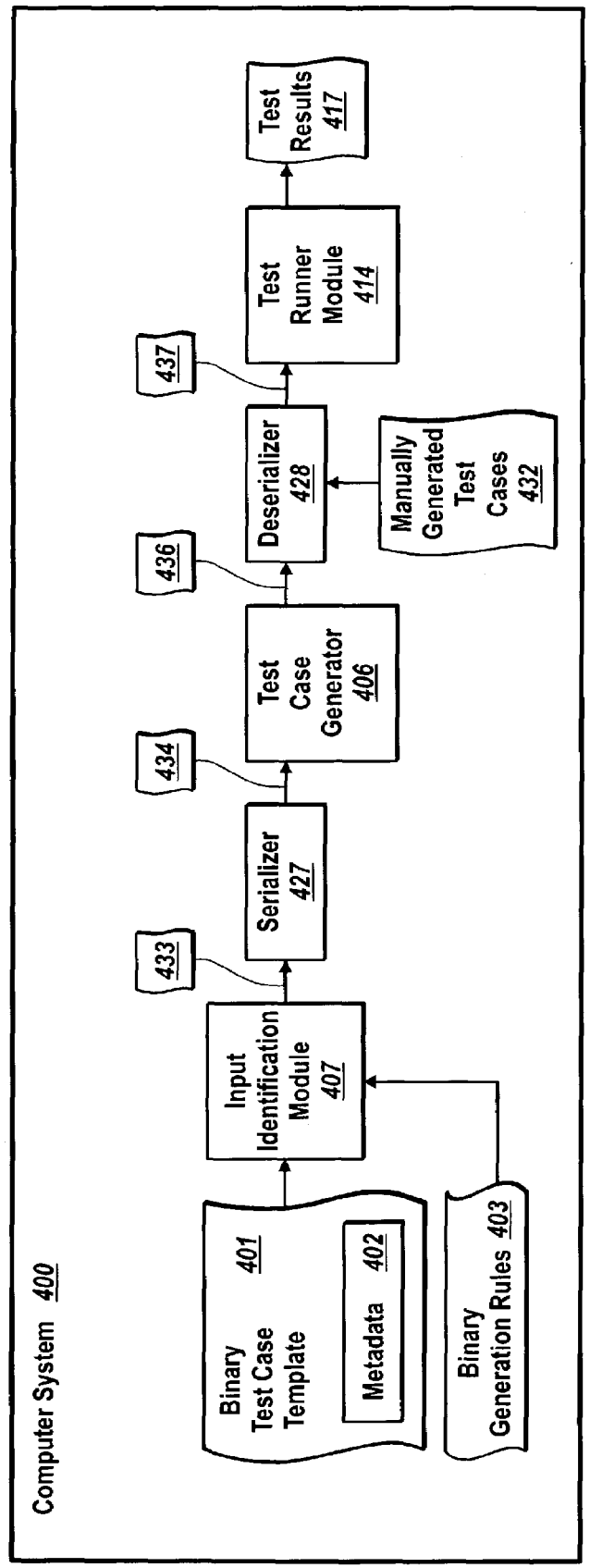
FIG. 4 illustrates a second example of a suitable computer system performing testing of an object in accordance with the principles of the present invention.

FIG. 4 illustrates a second example of a computer system 400 and associated modules and data structures that cooperatively interact to perform automated testing of an object in accordance with the principles of the present invention. The computer system 400 may be any computer system that is capable of executing software objects, such as, for example, computer system 120. However, those skilled in the art will recognize after having reviewed this description, that any computer system may implement the features of the present invention with suitable software and/or hardware. The rectangular elements in computer system 400 (input identification module 407, serializer 427, test case generator 406, deserializer 428, and test runner module 414) represent executable modules that facilitate the testing of an object represented in metadata 202. The scrolled elements (binary test case template 401, binary generation rules 403, manually generated test cases 432, binary test input 433, text-based test input 434, text-based test cases 436, and binary test cases 437) represent data that is processed by the executable modules to test an object represented in metadata 402.

Input identification module 407 receives binary test case template 401 and binary generation rules 403. Although illustrated separately, it may be that binary generation rules 403 are included within test case template 401. Binary generation rules 403 can represent a compiled version (e.g., a portable executable) of a source code version of generation rules. Alternately, binary generation rules 403 can be translated source code instructions that were loaded into system memory by an interpreter. Since input identification module 407 receives binary test case template 401 and binary generation rules 403, there is little if, any need, for a tester to create additional testing input logic and additional text based generation rules.

Binary generation rules 403 can include rule generation logic that indicates how input values for test input fields in metadata 402 are to be combined when generating test cases. Rule generation logic can include logical clauses that constrain combinations of test input fields and/or input values during test case generation. Logical clauses can be implemented to constrain a first input value for a first test input field when a second input value for a second test input field is "Not" a specified value. Further, logical clauses can be implemented to constrain a first input value for a first test input field when a second input value for a second test input field is "NotIn" a specified number of different values. On the other hand, logical clauses can also be implemented to constrain a first input value for a first test input field when a second input value for a second input field is "In" a specified number of different values. Logical clauses can also be compound clauses that include "And" and "Or" operators. Logical clauses can also be implemented to restrict input values for a test input field to a specified range of values (e.g., an integer range from 1 to 10).

When binary generation rules 403 are compiled binary generation rules (as opposed to interpreted), there is some likelihood that a compiler has checked the data types in the generation rules for equivalency with the data types in a test case template. Checking data types for equivalency reduces the chances of human error inherent in manually created generation rules. Further, generation rules are extensible. Thus, based on desired testing functionally, a tester may develop additional logical clauses and/or may come upon additional beneficial combinations of existing logical clauses.

The following portion of source code is an example of a source code version generation rules (hereinafter referred to simply as "example generation rules") written in the C# computer language:

```
1.  public override void AddRules(IPairwiseRuleAcceptor p)
2.  {
3.    TestFieldFactory tfc = this.TestFieldFactory;
4.    TestField mode = tfc[typeof(FileMode)];
5.    TestField share = tfc[typeof(FileShare)];
6.    TestField access = tfc["Access"];
7.
8.    // don't consider for automatic test case generation
9.    p.ExcludeOption(share, FileShare.Inheritable);
10.   p.ExcludeOption(mode, FileMode.Open);
11.
12.   p.AddRule(mode.In(FileMode.Append, FileMode.Truncate),
          access.Equal(FileAccess.Write));
13.
14.   p.AddRule(mode.Equal(FileMode.Truncate),
          access.NotIn(FileAccess.Read, FileAccess.ReadWrite));
15.
16.   // if ( ([Mode] = "OpenOrCreate") and ([Share] = "None") ) then
17.   //      [Access] <> "Write";
18.   p.AddRule(mode.Equal(FileMode.OpenOrCreate).And(share.Equal(FileShare.None)),
          access.NotEqual(FileAccess.Write));
19. }
```

The numbers at the beginning of each line of the example generation rules are line numbers that will be used to clarify the description of the example generation rules. However, these line numbers are not part of the source code. Lines preceded by a double slash ("//") are comments that aid in the description of the example generation rules. Generally, the example generation rules can be interpreted by input identification module 407 and appropriately combined with fields, data types, and attributes identified from metadata 402 (e.g., through reflection) to generate binary test input.

Line 1 indicates that the example generation rules are included in a method labeled "AddRules". When generating binary testing input, input identification module 407 can all the AddRules method to determine rules that are to be applied to identified metadata. Lines 3–6 results in the definition of the variables "mode", "share", and "access", which may correspond to the Mode, Share, and Access test input fields defined in the previously described example test case template.

Lines 9 and 10 indicate that specific input values for the share variable and the mode variable should not be automatically generated. More specifically, line 9 indicates that no test cases are to be automatically generated to test the "Inheritable" input value for the Share test input field. Similarly, line 10 indicates that no test cases are to be automatically generated to test the Open input value for the Mode test input field. However, these rules do not preclude testing these excluded input values through supplemental manually generated test cases.

The rule at line 12 indicates that for test cases where the input value for the Mode test input field is one of "Append" or "Truncate" that the input value for the Access test input field is to be set to an input value of "Write". The rule at line 14 indicates that for test cases where the input value for the Mode test input field is equal to "Truncate" that the input value for the Access test input field should not be set to an input value of "Read" or "ReadWrite". The Rule at line 18 is an example of a compound rule. The compound rule at line 18 indicates that if the input value for the Mode test input field is equal to "OpenOrCreate" and the input value for the Share test input field is equal to "None", then the input value for the Access test input field should not be set to an input value of "Write".

After combining fields, data types, and attributes indentifed from metadata 402 with binary geenration rules 403, input identification module 407 can generate binary test input 433 that is sent to serializer 427. Generally, binary-formatting is the process of converting a binary object into a format that can be compatibly transported to and received by another module. Serializer 427 is an example of a binary formater that converts binary objects (e.g., binary test input 433) into a text format (e.g., text-based test input 434) that can be compatibly transported to and received by test case generator 406.

Serialization is particularly advanageous when data types used by an input identification module (binary objects) differ from data types used by a test case generator (text-based instructions). For example, binary test input 433 can be automatically converted to text-based test input 434 without a tester having to interact with either the binary or the text-based test input. After serializing binary test input 433, serializer 427 sends text-based test input 434 to test case generator 406. In some embodiments, text-based test input 434 includes eXtensible Markup Language ("XML") instructions that are interpretable by test case generator 406. When appropriate, serilizer 427 also associates XML data in XML instructions with an XML schema (potentially also generated by the serializer 427) that contrains the XML data to the corresponding data types in binary test case template 401.

Test case generator 406 receives the text-based test input 434 and generates text-based test cases in accordance with text-based test input 434. Generating test cases can include a brute force approach, a random approach, or an N-wise approach as previously described. For example, test case generator 406 may utilize a pair-wise test case generation algorithm that is further constrained by attributes applied to fields in bianry test case template 401 and by rules from binary generation rules 403. Test case generator 406 can generate test cases that include XML data and XML instructions. Thus, in some embodiments, test case generator 406 converts one set of XML data and XML instructions (text-based test input 434) into a second set of XML data and XML instructions (text-based test cases 436).

After generating test cases, test case generator 406 sends text-based test cases 436 to deserializer 428. Deserializer 428 receives text-based test cases 436. Deserializer 428 is an example of a binary formater that converts text format data (e.g., text-based test cases 436) into binary objects (e.g., binary test cases 437) that can be compatibly transported to and received by test runner module 414. The binary formats utlized by test runner module 414 may or may not be the same as the binary formats utilized by input identification module 407. Deserializer 428 can also receive manually generated test cases 432.

Figure 2:
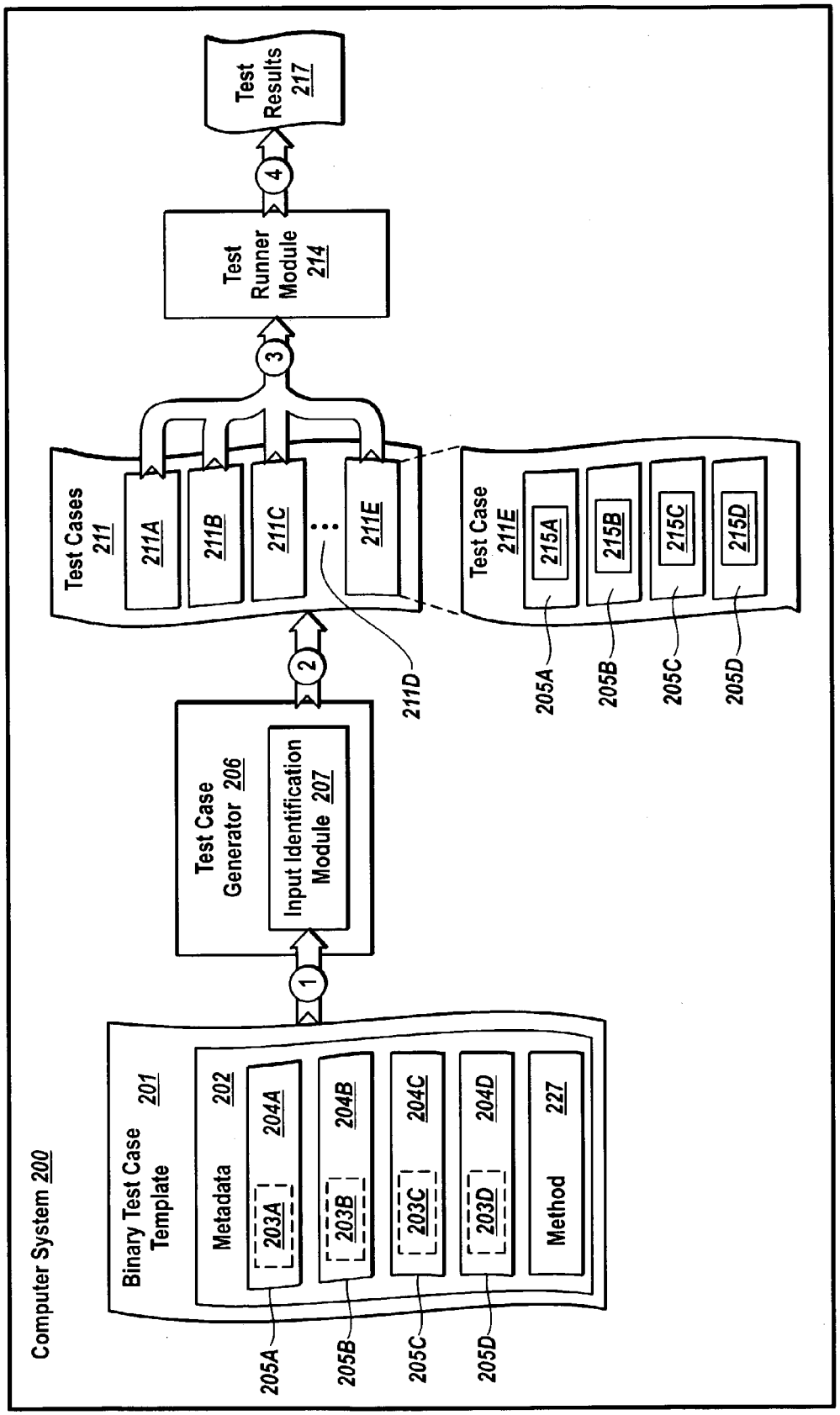
FIG. 2 illustrates a first example of a computer system and associated modules and data structures performing testing of an object in accordance with the principles of the present invention.
Figure 3:
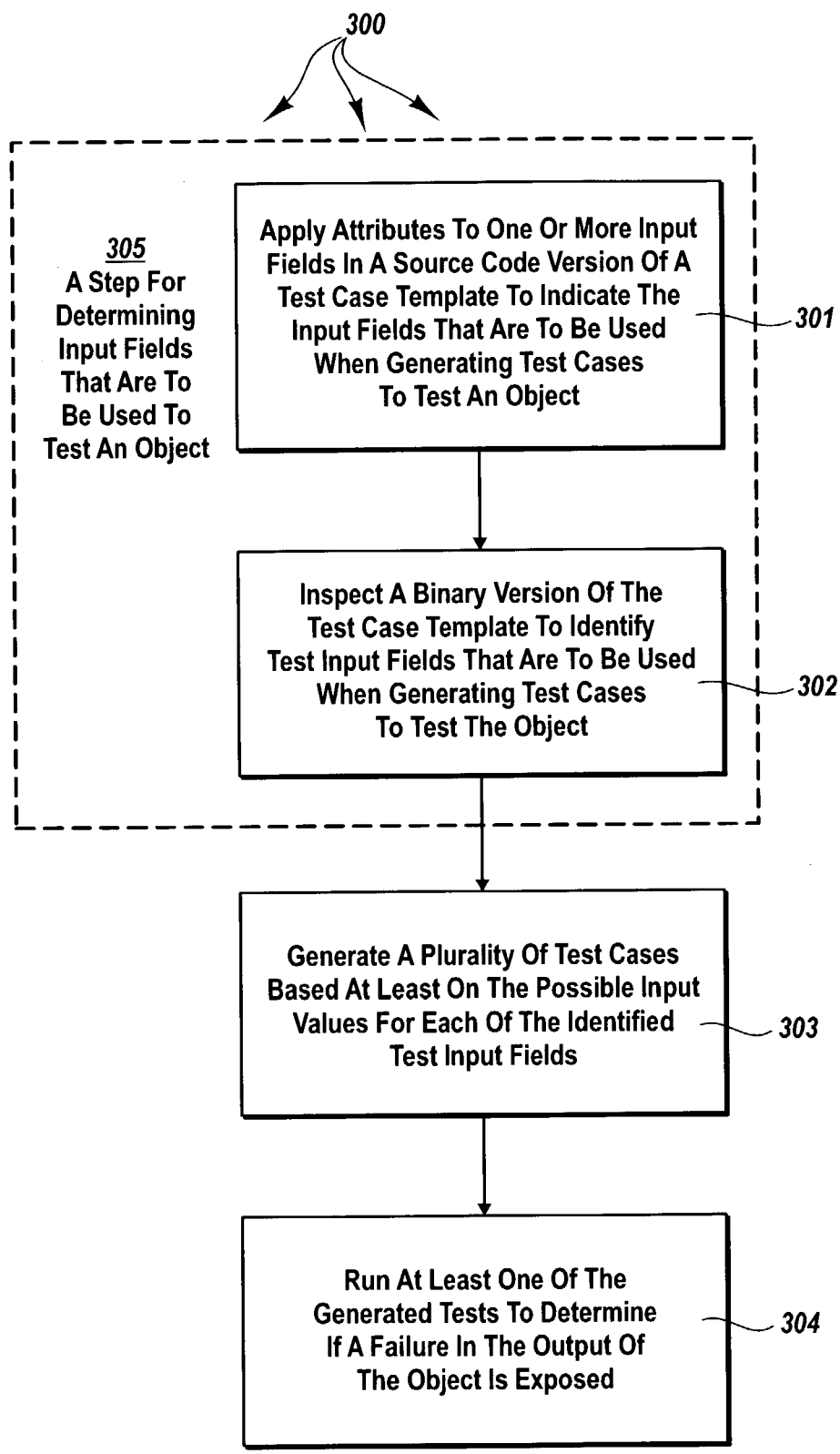
FIG. 3 illustrates a flowchart of a method for testing an object in accordance with the principles of the present invention.

In some embodiments, a deserializer receives supplemental manually generated test cases that are then converted into a binary format that is compatible with a test case generator. Referring briefly back to FIG. 2, a deserializer can be positioned to receive supplemental manually generated test cases that are deserialized for compatible reception by test case generator 206. In these embodiments, a deserialzer can be external from or included in test case generator 206. Test case generator 206 can include deserialized manually generated test cases along with automatically generated test cases in test cases 211.

Manually generated test cases 432 can be of text format that is similar to the text format of text-based text cases 436. For example, manually generated test cases 432 can include XML data and XML instructions constrained in accordance with the same XML schema used to constrain XML data and XML instructions in text-based test cases 436. When a tester is aware of specific test cases that might expose an output failure, the tester may choose to supplement automatically generated test cases with manually generated test cases 432.

The following portion of text is an example of a manually generated text-based test case (hereinafter referred to simply as the "example test case") including XML data and XML instructions:

```
1.  <FileTest Name='BadName'>
2.      <Access>Write</Access>
3.      <Mode>Create</Mode>
4.      <Share>Inheritable</Share>
5.      <Filename>bad::?name?</Filename>
6.      <ExpectFailure>True</ExpectFailure>
7.  </FileTest>
```

The numbers at the beginning of each line of the example test cases are line numbers that will be used to clarify the description of the example test case. However, these line numbers are not part of the XML data and XML instructions. The example test case may be an explicit test case used to test the FileStream creation method in the previously described example test case template. Elements in the example test case can be defined in accordance with an XML schema that constrains XML data contained in the elements to corresponding data types in the example test case template. For example, the "Write" at line 2 can be constrained to a FileAccess enumerated data type.

Line 1 of the example test case indicates that the name of the example test is "BadName". This is a descriptive name used to indicate that the example test is to be used to test the FileStream creation method using a "bad" filename. A bad filename can be, for example, a filename including characters that are not supported by an operating system. Line 2 indicates that an Access test input field is to receive an input value of "Write". Line 3 indicates that a Mode test input field is to receive an input value of "Create". Line 4 indicates that a Share test input field is to receive an input value of "Inheritable".

Line 5 indicates that a Filename test input field is to receive an input value of "bad::?name?". This is an input value that is configured to cause File Stream creation to fail. Line 6 indicates that the combination of the input values in the example test case should cause file stream generation to fail. That is, failure of the example test case is the expected result.

After deserializing text-based test cases 436 and, if appropriate, manually generated test cases 432, deserializer 428 sends binary test cases 437 to test runner module 414. Test runner module 414 receives binary test cases 437. Test runner module 414 then executes each test case included to binary test cases 437 to determine if particular combinations of input values to an object expose failures in the object's output. Test runner module 414 can output the results of each test case to test results 417 for later viewing by a tester.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired secured by United States Letters Patent is:

1. In a computer system that is capable of executing a software object, a method for testing the software object to expose failures in the functionality of the software object, the method comprising the following:

an act of inspecting a binary version of a test case template that includes an object that is to be tested for intended behavior, the inspection to identify annotations annotating one or more individual input fields that are part of the object, the annotations representing applied attributes applied on a per field basis to individually constrain how corresponding values for each individual input field are to be varied, from among a range of available values based on the input field data type, when generating test cases for testing the object for the intended behavior such that test cases can be generated through reference to the annotations;

an act of automatically generating a plurality of test cases for testing the object for the intended behavior, each test case including a value for each of the one or more individual input fields, the combination of values for each test case constrained in accordance with the applied attributes represented in the annotations to the one or more individual input fields of the object;

an act of invoking the object using the values of the one or more input fields specified in the at least one generated test case to attempt to cause the object to exhibit the intended behavior;

an act of accessing execution data for the object for each of the at least one test cases, the execution data indicating whether or not the intended behavior was exhibited for the test case;

an act of identifying test cases that did not cause the intended behavior to be exhibited as failed test cases;

an act of recording input values for the one or more input fields for any failed test cases on physical storage media; and wherein the act of automatically generating a plurality of test cases comprises:

an act of automatically converting the binary test input to text-based test input comprising an act of serializing the binary test input into XML instructions;

an act of automatically generating a plurality of text-based test cases from the text-based test input;

an act of automatically converting at least the automatically generated plurality of text-based test cases into a corresponding plurality of binary test cases representative of the constraints in the binary test input comprising an act of deserializing XML instructions into binary test cases.

2. The method as recited in claim 1, further comprising:

an act of compiling a source code version of the test case template into the binary version of the test case template.

3. The method as recited in claim 2, wherein the act of compiling a source code version of the test case temple into the binary version of the test case template comprises an act of compiling the source code version of the test case temple into a language independent portable executable.

4. The method as recited in claim 1, wherein the act of inspecting a binary version of the test case template to identify annotations comprises an act of using reflection to inspect metadata contained in the binary version of the test case template.

5. The method as recited in claim 1, wherein the act of inspecting a binary version of the test case template to identify annotations comprises an act of identifying the data type of each of the test input fields.

6. The method as recited in claim 1, wherein the act of inspecting a binary version of the test case template to identify annotations comprises an act of identifying an attribute applied to at least one of the test input fields.

7. The method as recited in claim 1, further comprising:

an act of receiving binary generation rules that restrict specified combinations of input values for the one or more input fields.

8. The method as recited in claim 1, wherein the act of automatically generating a plurality of test cases for testing the object for intended behavior comprises an act of automatically generating a plurality of test cases based on the possible input values for each of the one or more input fields, on annotations to the one or more input fields, and on binary generation rules.

9. The method as recited in claim 1, wherein the act of automatically generating a plurality of test cases for testing the object for intended behavior comprises an act of using an N-wise algorithm to generate test cases.

10. The method as recited in claim 9, wherein the act of using an N-wise algorithm to generate test cases comprises an act of using a pair-wise algorithm to generate test cases.

11. The method as recited in claim 9, wherein the act of using an N-wise algorithm to generate test cases comprises an act of using an all values algorithm to generate test cases.

12. The method as recited in claim 1, wherein the act of automatically generating a plurality of test cases for testing the object for intended behavior comprises an act of using an algorithm that randomly generates test cases.

13. The method as recited in claim 1, wherein the act of automatically generating a plurality of test cases for testing the object for intended behavior comprises an act of generating a test case for every possible combination input values for the test input fields.

14. The method as recited in claim 1, wherein the act of invoking the object comprises an act of dynamically invoking the object with a combination of input values for the one or more input fields.

15. The method as recited in claim 1, further comprising:
an act of storing results of the at least one generated test case for subsequent viewing by a tester on physical storage media.

16. In a computer system that is capable of executing a software object, a method for testing the software object to expose failures in the functionality of the software object, the method comprising the following:
an act of receiving a binary test case template including an object that is to be tested for intended behavior, the binary test case template including annotations annotating one or more individual input fields that are part of the object, the annotations representing applied attributes applied on a per field basis to individually constrain how corresponding values for each individual input field are to be varied, from among a range of available values based on the input field data type, when generating test cases for testing the object for an intended behavior such that test cases can be generated through reference to the annotations;
an act of receiving binary generation rules that further constrain combinations of input values for the one or more input fields;
an act of automatically generating binary test input for testing the object for the intended behavior, the combination of values for each test case constrained in accordance with the applied attributes represented in the annotations to the individual input fields of the object and in accordance with the binary generation rules;
an act of automatically converting the binary test input to text-based test input comprising an act of serializing the binary test input into XML instructions;
an act of automatically generating a plurality of text-based test cases from the text-based test input;
an act of automatically converting at least the automatically generated plurality of text-based test cases into a corresponding plurality of binary test cases representative of the constraints in the binary test input comprising an act of deserializmnn XML instructions into binary test cases;
an act of automatically executing at least one of the binary test cases to attempt to cause the object to exhibit the intended behavior;
an act of accessing execution data for the object for the at least one test case, the execution data indicating whether or not the intended behavior was exhibited for the test case; and
an act of recording input values for the one or more input fields for test cases that did not cause the object to exhibit the intended behavior on physical storage media.

17. The method as recited in claim 16, wherein the act of receiving a binary test case template comprises an act of receiving a language independent portable executable.

18. The method as recited in claim 16, wherein the act of receiving a binary test case template comprises an act of interpreting instructions of a source code version of the test case template.

19. The method as recited in claim 16, wherein the act of receiving binary generation rules comprises an act of receiving binary generation rules that are contained in the binary test case template.

20. The method as recited in claim 16, wherein the act of automatically generating binary test input comprises an act of automatically generating binary test input based on attributes contained in metadata.

21. The method as recited in claim 16, wherein the act of automatically generating a plurality of text-based test cases from the text-based test input comprises an act of using a pair-wise algorithm to generate the plurality of text-based test cases.

22. The method as recited in claim 16, wherein the act of automatically generating a plurality of text-based test cases from the text-based test input comprises an act of generating XML instructions.

23. The method as recited in claim 16, further comprising:
an act of receiving at least one manually generated test case.

24. The method as recited in claim 16, wherein the act of automatically converting at least the automatically generated plurality of text-based test cases into a corresponding plurality of binary test cases comprises an act of converting the automatically generated plurality of text-based test cases along with at least one manually generated text-based test case into a corresponding plurality of binary test cases.

25. The method as recited in claim 16, wherein the act of automatically executing at least one of the binary test cases comprises an act of dynamically invoking the object in accordance with the input values of a binary test case.

26. The method as recited in claim 16, further comprising:
an act of storing results of executing the at least one binary test case on physical storage media.

27. A computer program product for use in a computer system that is capable of executing a software object, the computer program product for implementing a method for testing the software object to expose failures in the functionality of the software object, the computer program product comprising one or more physical media having stored thereon computer executable instructions that, when executed by a processor, cause the computer system to perform the following:
inspect a binary version of a test case template that includes an object that is to be tested for intended behavior, the inspection to identify annotations annotating one or more individual input fields that are part of the object, the annotations representing applied attributes applied on a per field basis to individually constrain how corresponding values for each individual input field are to be varied, from among a range of available values based on the input field data type, when generating test cases for testing the object for an intended behavior such that test cases can be generated through reference to the annotations;
automatically generate a plurality of test cases for testing the object for the intended behavior, each test case including a value for each of the one or more individual input fields, the combination of values for each test case constrained in accordance with the applied attributes represented in the annotations to the one or more individual input fields of the object;
invoke the object using the values of the one or more input fields specified in the at least one generated test case to attempt to cause the object to exhibit the intended behavior;
access execution data for the object for each of the at least one test cases, the execution data indicating whether or not the intended behavior was exhibited for the test case;

identify test cases that did not cause the intended behavior to be exhibited as failed test cases;
record input values for the one or more input fields for any failed test cases; and
wherein the act of automatically generating a plurality of test cases comprises:
an act of automatically converting the binary test input to text-based test input comprising an act of serializing the binary test input into XML instructions;
an act of automatically generating a plurality of text-based test cases from the text-based test input;
an act of automatically converting at least the automatically generated plurality of text-based test cases into a corresponding plurality of binary test cases representative of the constraints in the binary test input comprising an act of deserializing XML instructions into binary test cases.

28. The computer program product as recited in claim 27, wherein the computer-executable instructions, that when executed by a processor, cause the computer system to inspect a binary version of a test case template comprise computer-executable instructions, that when executed by the processor, cause the computer system to use reflection to inspect metadata contained in the binary version of the test case template.

29. The computer program product as recited in claim 27, wherein the one or more physical media further have stored therein computer-executable instructions, that when executed by a processor, cause the computing system to perform the following:
receive binary generation rules that restrict specified combinations of input values for the test input fields.

30. The computer program product as recited in claim 27, wherein the computer-executable instructions, that when executed by a processor, cause the computer system to generate a plurality of test cases comprise computer-executable instructions, that when executed by the processor, cause the computer system to generate test cases in accordance with a pair-wise algorithm.

31. The computer program product as recited in claim 27, wherein the computer-executable instructions, that when executed by a processor, cause the computer system to invoke the object comprise computer-executable instructions, that when executed by the processor, cause the computer system to invoke the object with a combination of input values for the annotated input fields.

32. A computer program product for use in a computer system that is capable of executing an software object, the computer program product for implementing a method for testing the software object to expose failures in the functionality of the software object, the computer program product comprising one or more physical media having stored thereon computer executable instructions that, when executed by a processor, cause the computer system to perform the following:
receive a binary test case template foe-the that includes an object that is to be tested for intended behavior, the binary test case template including annotations annotating one or more individual input fields that are part of the object, the annotations representing applied attributes applied on a per field basis to individually constrain how corresponding values for each individual input field are to be varied, from among a range of available values based on the input field data type, when generating test cases for testing the object for an intended behavior such that test cases can be generated through reference to the annotations;
receive binary generation rules that further constrain combinations of input values for the one or more input fields;
automatically generate binary test input for testing the object for the intended behavior, the combination of values for each test case constrained in accordance with the applied attributes represented in the annotations to the individual input fields of the object and in accordance with the binary generation rules;
convert the binary test input to text-based test input by serializing the binary test input into XML instructions;
generate a plurality of text-based test cases from the text-based test input;
convert at least the automatically generated plurality of text-based test cases into a corresponding plurality of binary test cases representative of the constraints in the binary test input by deserializin XML instructions into binary test cases;
execute at least one of the binary test cases to attempt to cause the object to exhibit the intended behavior;
access execution data for the object for the at least one test case, the execution data indicating whether or not the intended behavior was exhibited for the test case; and
record input values for the one or more input fields for test cases that did not cause the object to exhibit the intended behavior.

33. The computer program product as recited in claim 32, wherein the one or more physical media further have stored therein computer-executable instructions, that when executed by a processor, cause the computing system to perform the following:
an act of receiving at least one manually generated test case.

34. The computer program product as recited in claim 32, wherein the computer-executable instructions, that when executed by a processor, cause the computer system to convert at least the automatically generated plurality of text-based test cases into a corresponding plurality of binary test cases comprise computer-executable instructions, that when executed by the processor, convert the plurality of text-based test cases along with at least one manually generated text-based test case into a corresponding plurality of binary test cases.

35. In a computer system that is capable of executing a software object, a method for testing the software object to expose failures in the functionality of the software object, the method comprising the following:
a step for determining that annotations to one or more individual input fields that are part of an object contain applied attributes that are to be used to test the object, the applied attributes applied on a per field basis to individually constrain how corresponding values for each individual input field are to be varied, from among a range of available values based on the input field data type, when generating test cases for testing the object for an intended behavior such that test cases can be generated through reference to the annotations;
an act of automatically generating a plurality of test cases for testing the object for the intended behavior, each test case including a value for each of the one or more individual input fields, the combination of values for each test case constrained in accordance with the applied attributes represented in the annotations to the one or more individual input fields of the object;
an act of invoking the object using the values of the one or more input fields specified in the at least one generated test case to attempt to cause the object to exhibit the intended behavior;

an act of accessing execution data for the object for each of the at least one test cases, the execution data indicating whether or not the intended behavior was exhibited for the test case;

an act of identifying test cases that did not cause the intended behavior to be exhibited as failed test cases;

an act of recording input values for the one or more input fields for any failed test cases on physical storage media; and wherein the act of automatically generating a plurality of test cases comprises:

an act of automatically converting the binary test input to text-based test input comprising an act of serializing the binary test input into XML instructions;

an act of automatically generating a plurality of text-based test cases from the text-based test input;

an act of automatically converting at least the automatically generated plurality of text-based test cases into a corresponding plurality of binary test cases representative of the constraints in the binary test input comprising an act of deserializing XML instructions into binary test cases.

* * * * *